United States Patent [19]

Konkal et al.

[11] 3,803,928
[45] Apr. 16, 1974

[54] SINGLE SPINDLE MECHANICAL FEED UNIT

[75] Inventors: John Konkal, Bloomfield Hills; James Egbert, Union Lake; Robert W. Richards, Sterling Heights, all of Mich.

[73] Assignee: LaSalle Machine Tool, Inc., Warren, Mich.

[22] Filed: Oct. 30, 1972

[21] Appl. No.: 302,052

[52] U.S. Cl......... 74/89.15, 74/665 GA, 74/424.8 R
[51] Int. Cl............................................ F16h 27/02
[58] Field of Search........ 74/89.15, 424.8 R, 665 G, 74/665 GA, 665 GE, 25

[56] References Cited
UNITED STATES PATENTS

| | | | |
|---|---|---|---|
| 3,038,352 | 6/1962 | Murphy | 74/665 GA |
| 2,101,117 | 12/1937 | Weston | 74/665 GE |
| 2,368,151 | 1/1945 | McConnell | 74/665 GA |
| 2,883,183 | 4/1959 | Finsterwalder et al. | 74/89.15 |
| 2,711,653 | 6/1955 | Zero | 74/25 |

Primary Examiner—Benjamin W. Wyche
Assistant Examiner—Wesley S. Ratliff, Jr.
Attorney, Agent, or Firm—Olsen and Stephenson

[57] ABSTRACT

A single spindle mechanical feed unit comprising a slide and a single rotatable spindle mounted for advancing and retracting movement relative to the slide. A drive shaft is arranged in a coaxial driving relation with the spindle and a nut and screw assembly capable of applying thrust forces to the spindle is also axially aligned with the spindle. A simplified drive mechanism is provided for rotating the drive shaft and for driving the nut and screw assembly at variable rates of speed.

6 Claims, 1 Drawing Figure

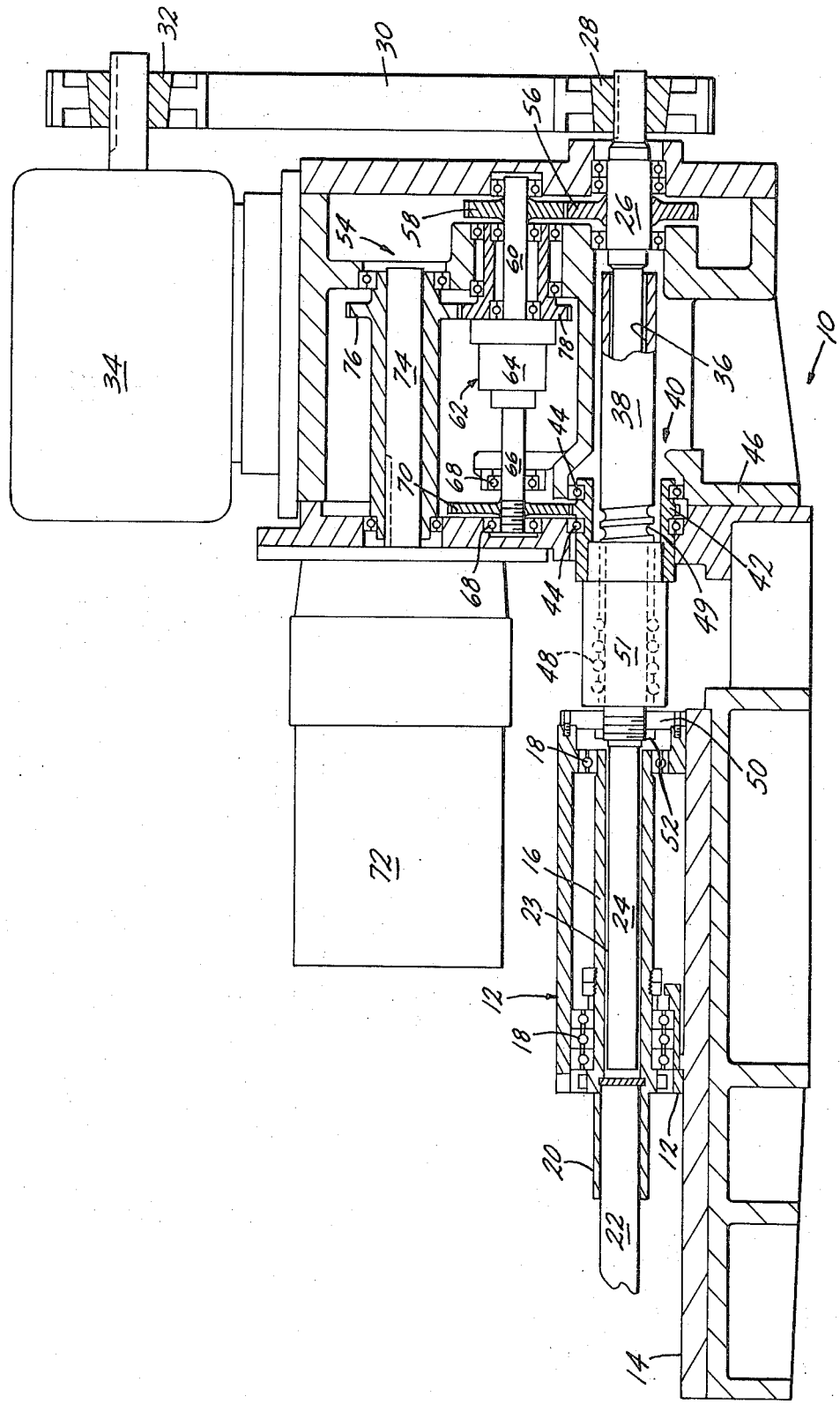

SINGLE SPINDLE MECHANICAL FEED UNIT

SUMMARY OF THE INVENTION

This invention consists of a mechanical feed unit for both rotating and reciprocating a tool holding spindle. The principal advantages of the feed unit of this invention are that it provides a thrust force for reciprocating the spindle that is concentric with the axis of the spindle thereby eliminating the complexities that are inherent in a unit in which compensation must be made for off-center forces on the spindle. In addition, in the feed unit of this invention, both spindle rotation and spindle reciprocation originate with a simplified drive mechanism. The principal object of this invention, therefore, is to provide an improved single spindle mechanical feed unit of the type that is used in large numbers in automated machine tool lines.

The feed unit of this invention consists of a spindle that is both rotatably mounted and mounted for back and forth movement on a slide. A ball nut and screw assembly is associated with the spindle so that rotation of the nut will result in translatory movement of the spindle on the slide. The nut and screw assembly is hollow and a drive shaft extends therethrough into splined engagement with the spindle for driving the spindle.

A drive mechanism is connected to and extended between the drive shaft and the nut in the ball nut and screw assembly. A gear reduction unit in the drive mechanism is associated with a second motor so that variable speeds of rotation of the nut can be achieved.

Further objects, features and advantages of this invention will become apparent from a consideration of the following description, the appended claims, and the accompanying sole FIGURE which is a longitudinal sectional view of the mechanical feed unit of this invention.

With reference to the FIGURE, the mechanical feed unit of this invention, indicated generally at 10, is illustrated in FIG. 1 as including a slide 12 mounted for reciprocating movement on a way 14. A spindle 16 is rotatably mounted on bearings 18 carried by the slide 12 and is connected to a tool holder 20 in which a tool 22, such as a drill, reamer, tap, etc., is mounted. The spindle 16 is connected by spline teeth 23 to a portion 24 of an elongated drive shaft 26 connected to a drive pulley 28. A belt 30 extends about the pulley 28 and a second pulley 32 driven by a reversible motor 34 so that the drive shaft 26 is rotated in response to operation of the motor 34. Intermediate its ends, the drive shaft 26 extends through an axial opening 36 in the screw 38 for a nut and screw assembly 40 which will be described in greater detail hereinafter. Thus, by virtue of the spline connection of the spindle 16 to the drive shaft 26, rotation of the drive shaft 26 causes rotation of the spindle 16 which in turn results in rotation of the tool 22.

The ball screw assembly 40 also includes a drive member 42 which is mounted on bearings 44 supported by the main frame 46 for the unit 10. A nut member 51 is secured to the driver 42 and encircles the screw 38. The nut 51 and the screw 38 are drivingly connected by a series of balls 48 located in a spiral flute 49 in the screw 38 so that when the nut 51 is rotated in the main frame 46, the screw 38 is moved axially. At one end, the screw 38 is connected by a plate 50 and a nut 52 to the slide 12. As a result, reciprocation of screw 38 causes reciprocation of spindle 16 and thus back and forth movement of tool 22.

A drive mechanism 54 is provided for driving the driver 42 and thus the nut 51. The mechanism 54 consists of a first gear 56 secured to the drive shaft 26 and arranged in meshing engagement with a second gear 58 that is mounted on a short auxiliary shaft 60 that is substantially parallel to the drive shaft 26. The auxiliary shaft 60 is connected to the internal mechanism (not shown) in a conventional gear reduction or drive unit 62 that includes an outer housing 64 and an output shaft 66. The unit 62 can be any one of a number of units that are commercially available and the details of which form no part of the present invention. The unit 62 functions as follows. When the housing 64 is held and shaft 60 is rotated, output shaft 66 rotates at a slow speed. When housing 64 is rotated, shaft 60 free wheels and shaft 66 is rotated at a higher rate of speed.

The output shaft 66 is rotatably supported on bearings 68 carried by the frame 46. A gear 70 drivingly connects the output shaft 66 to the driver 42. As a result, when the output shaft 66 is being rotated, the driver 42 is being rotated to cause axial movement of the screw 38 which produces an axial thrust force on the tool 22.

A reversible brake motor 72 has an output shaft 74 secured to a gear 76 which in turn meshes with a gear 78 secured to the drive unit housing 64. When the motor 72 is operated as a brake, it holds the gear 78 and thus the housing 64 in a fixed position. Alternatively the motor 72 is operable to drive the housing 64 so as to rotate the shaft 66 at an increased speed.

In the use of the feed unit 10, the drive shaft 26 is in a direct driving relation with the spindle 16 so as to provide for a direct drive of the tool 22 whenever the drive shaft 26 is rotated. When rapid advance of the slide 12 is desired, such as when moving the tool 22 up to the workpiece, the motor 72 is operated so as to rotate the output shaft 66 to in turn rotate the nut 51 to advance the screw 38 and thereby advance the slide 12. During normal feed of the tool 22 into the work, the motor 72 is operated so that it functions as a brake to hold the housing 64 in the drive unit 62 in a fixed position. The input shaft 60 then drives the output shaft 66 at a reduced rate of speed so that the screw 38 and the spindle 12 are advanced at a slower speed. Withdrawal of the tool 22 at the same slow rate of speed can be effected by reversing motor 34. Similarly, rapid return of the slide 12 is accomplished by operating motor 72 in a reverse direction.

From the above description it is seen that this invention provides an improved mechanical feed unit 10 in which the thrust force for the tool 22 is concentric with the axis of the tool 22. This desirable result is achieved by locating the screw 38 in a coaxial relation with the spindle 16. This construction is made possible by extending the drive shaft 26 axially through the ball screw 38 and into splined engagement with the spindle 16. This enables both spindle rotation and spindle reciprocation to be obtained by operation of a simplified drive mechanism. In addition, the extension of drive shaft 26 axially through the screw 38 provides for direct drive of spindle 16.

What is claimed is:

1. In machine tool apparatus which includes a slide and a rotatable spindle mounted on the slide, a drive shaft drivingly engaged with said spindle so that rotation of said drive shaft causes rotation of said spindle, a nut and screw assembly disposed in a coaxial relation with said spindle, said nut and screw assembly being connected to said slide so that rotatable driving of said assembly is operable to advance and retract said slide, and drive means extending from said drive shaft to said nut and screw assembly for driving said assembly.

2. Machine tool apparatus according to claim 1 wherein said drive means comprises motor means drivingly connected to said drive shaft, an auxiliary shaft, gear means connected to and extending between said drive shaft and said auxiliary shaft, a drive unit connected to said auxiliary shaft, gear means arranged in a driving relation with said nut and screw assembly, and an output shaft for said drive unit arranged in a driving relation with said gear means, said auxiliary shaft being operable to drive said output shaft at a predetermined rate of speed.

3. Machine tool apparatus according to claim 2 further including brake motor means and means connecting said brake motor means to said drive unit so that said brake motor means is operable to drive said output shaft at an increased rate relative to said predetermined rate at which said output shaft is driven by said auxiliary shaft.

4. Machine tool apparatus according to claim 3 wherein said auxiliary and outputs shafts are substantially parallel to said drive shaft.

5. Machine tool apparatus according to claim 1 wherein said nut and screw assembly comprises a hollow screw positioned about said drive shaft and a nut encircling said screw and mounted for non-translatory rotatable movement so that rotation of said nut causes axial movement of said screw, and means connecting said screw to said slide so that axial movement of said screw will cause advancing and retracting movement of said slide.

6. Machine tool apparatus according to claim 5 further including coacting spline means on said spindle and said drive shaft providing for driving of said spindle by said drive shaft.

* * * * *